June 6, 1961 W. B. WATSON 2,987,649

COUPLING ARRANGEMENT

Filed Jan. 30, 1958 2 Sheets-Sheet 1

INVENTOR:
WALLACE B. WATSON,

BY T. E. Kristoffeson

HIS ATTORNEY.

June 6, 1961 W. B. WATSON 2,987,649

COUPLING ARRANGEMENT

Filed Jan. 30, 1958 2 Sheets-Sheet 2

INVENTOR:
WALLACE B. WATSON,

BY T. E. Kristofferson

HIS ATTORNEY.

United States Patent Office 2,987,649
Patented June 6, 1961

2,987,649
COUPLING ARRANGEMENT

Wallace B. Watson, Clay, N.Y., assignor to General Electric Company, a corporation of New York Filed Jan. 30, 1958, Ser. No. 712,198
2 Claims. (Cl. 315—30)

This invention relates to an improved arrangement for coupling electrical signals to a high voltage circuit and, more particularly, to an arrangement for eliminating high voltage coupling components such as capacitors in an application such as cathode ray tube displays wherein a plurality of signals such as video contrast, blanking and intensity control signals are to be coupled to one gun electrode of a cathode ray tube.

In many electrostatic deflection cathode ray tube displays, it is desirable to operate the deflection circuits at low voltage relative to ground. This necessitates operating the cathode at a minus high voltage. Applying video drive voltage to electrodes at such high D.-C. potentials introduces many problems. For example, normally a large capacitor is employed to decouple the high voltage circuit from the other circuits associated with the cathode. If large coupling condensers are used there is a considerable shock hazard. These large condensers also lead to undesirable transient phenomena in turning the cathode ray tube on and off which tend to burn phosphors presently in use and which become increasingly objectionable with the higher voltages now being used. The use of capacitors also leads to difficulties in attempting to obtain good low and high frequency coupling to the electrode which is normally being maintained at a high negative potential. Since the high potential requires large high voltage coupling capacitors, it is very difficult to maintain good low frequency response. In addition, the use of high impedance capacitors accentuates cathode ray tube leakage problems which could be minimized by a low impedance output coupling circuit.

When coupling capacitors are used, the intensifier circuit requires an output amplifier and a clipper and D.-C. restoration is required after the coupling capacitors at the high voltage point in order to maintain adjustment.

In order to overcome these difficulties, it is an object of this invention to provide an improved operation by providing a coupling system with a frequency response from zero up to as high as required.

Another object is to provide improved safety by eliminating the need for high capacity high voltage coupling capacitors.

Still another object is to remove the need for D.-C. restorers and their associated components at the high voltage point.

Still another object of this invention is to apply blanking, intensifier and mixed video signals to one element of a gun of a cathode ray tube with consequent improved performance and reduction of components.

A further object is to provide a coupling circuit with a low impedance output in order to reduce some of the cathode ray tube leakage problems which limit operation with some circuits.

A still further object is to eliminate the intensifier output amplifier and clipper.

A still further object is to eliminate the transients normally caused by the coupling capacitors during warm-up and shut-off which is of increasing importance with higher voltages and more easily burned phosphors.

In carrying out the invention in one form thereof, video contrast and intensity level signals are modulated on an RF carrier provided by an oscillator which is gated on and off for blanking purposes. This modulated signal has a small relative bandwidth and can, therefore, be easily passed through a D.-C. insulated transformer. The output of the secondary of the insulating transformer may be rectified and applied to the cathode or the grid of a cathode ray tube gun.

The novel features which are believed to be characteristic of the invention are set forth with particularity in the appended claims. The invention itself, however, together with further objects and advantages thereof can best be understood by reference to the following description taken in conjunction with the accompanying drawings in which:

Figure 1:
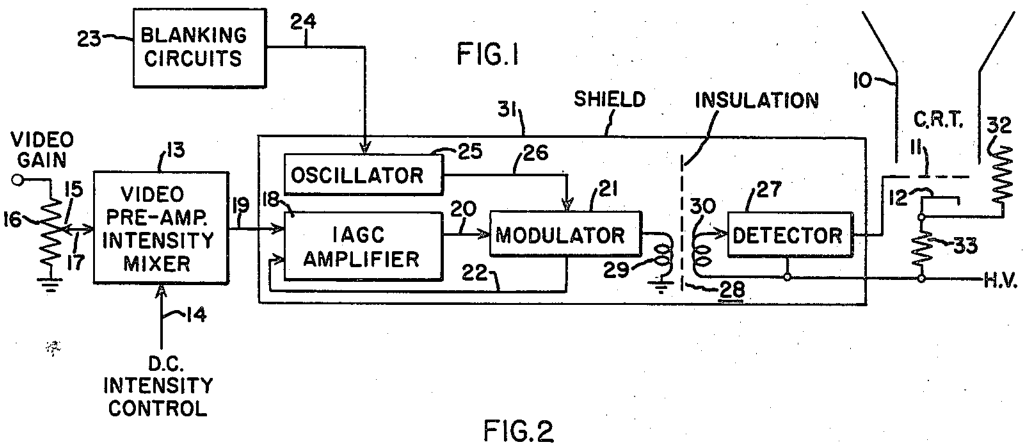
FIG. 1 illustrates a block diagram of the coupling circuit of the invention.

Turning now to the drawings, in FIG. 1 there is illustrated a cathode ray tube 10 having a gun grid electrode 11 and a gun cathode electrode 12. It is desired to couple D.-C. intensity control signals and video contrast signals to the grid electrode 11 of cathode ray tube 10. In order to do this a D.-C. coupled video preamplifier 13 is provided whose D.-C. level is controlled by a D.-C. intensity control signal applied to an input lead 14, and whose gain is controlled by a video gain signal taken from a tap 15 on potentiometer 16 and applied to the video preamplifier 13 over an input lead 17.

The output of video preamplifier 13 is a mixed signal containing both contrast and intensity information and is coupled to an instantaneous automatic gain control amplifier 18 by means of lead 19. The output of instantaneous automatic gain control amplifier 18 is fed, by means of lead 20, to a modulator circuit 21. The modulator circuit 21 is provided with degenerative feedback by connection of lead 22 therefrom back to the input of instantaneous automatic gain control circuit 18.

Blanking signals, derived from blanking circuits 23, are connected by means of lead 24 to a high frequency oscillator 25 used to establish an RF carrier frequency. The blanking signals gate the oscillator 25 on and off for blanking purposes.

The gated carrier provided by oscillator 25 is connected over lead 26 to modulator 21 where it is modulated by the incoming video information received over lead 20. The output of modulator 21 is coupled to a detector 27 by means of a coupling transformer 28 having a primary winding 29 connected across the output of modulator 21 and a secondary winding 30 connected across the detector 27. The output of detector 27 may then be coupled directly to the cathode ray tube gun grid electrode 11.

The oscillator 25, modulator 21, instantaneous automatic gain control amplifier 18, transformer 28 and detector 27 are conveniently packaged and are contained within an RF shield 31 to provide the required RF shielding and D.-C. isolation.

An auxiliary intensity control (not shown) may be connected by means of resistor 32 to the cathode 12 of the cathode ray tube to compensate for variation of cathode ray tube cutoff characteristics. The detector 27 may be eliminated in some cases, but it is included to allow for better shielding of the oscillator 25 and consequent reduction in radio noise. A minus high voltage (—H.V.) may be coupled to cathode 12 by means of a resistor 33 as shown.

Various elements shown in FIG. 1 could be eliminated in order to achieve certain specified objectives. For instance, if it was desired to provide the cathode ray tube with a source of blanking signals the blanking circuit 23 might be connected to oscillator 25 and directly to a coupling transformer such as 28 and thence to the grid electrode of the cathode ray tube. Other possible combinations might include a gated oscillator 25 feeding the modulator 21, and an additional intensity signal feeding modulator 21, provided with a coupling transformer such as 28 for coupling blanking and intensity information to a single electrode of a cathode ray tube. Another alternative would employ a linear modulator 21, and couple video information directly to modulator 21, which could be provided with a carrier from a gated oscillator such as 25 and then coupled to cathode ray tube through a coupling transformer such as 28.

Figure 2:
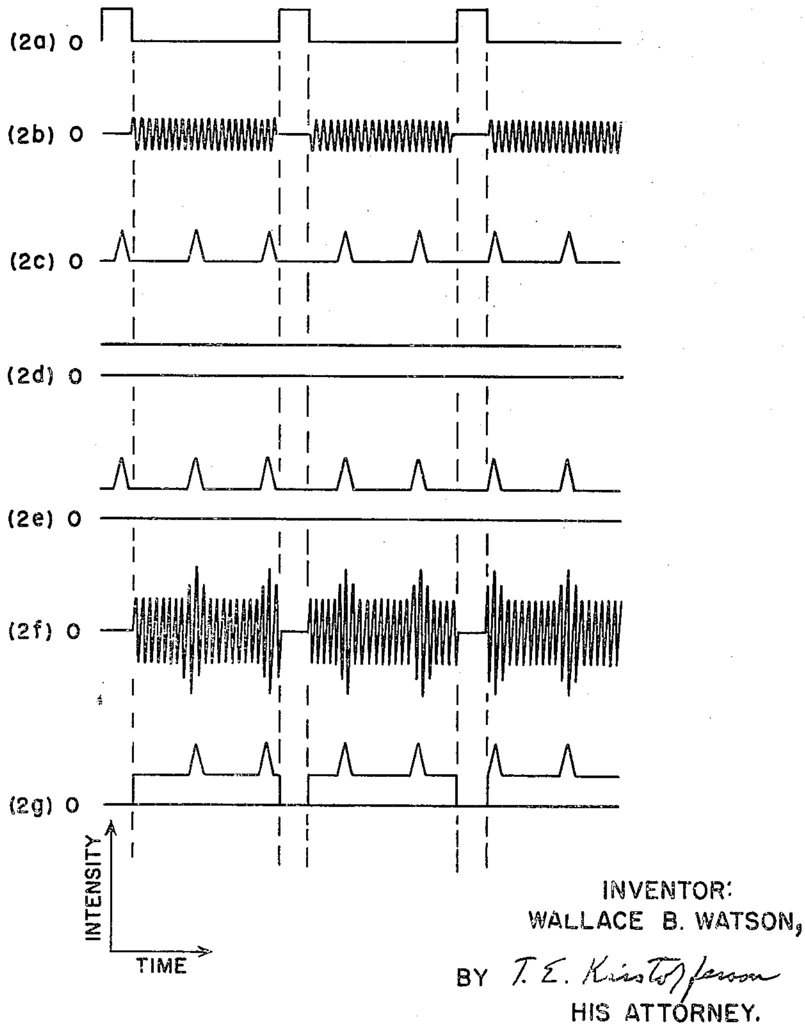
FIG. 2 illustrates various waveforms present in the circuit of FIG 1.

The operation of the circuit of FIG. 1 will become more apparent upon referring to the waveforms shown in FIG. 2. FIG. 2A illustrates the waveform emanating from blanking circuit 23 of FIG. 1 and is shown to be a series of pulses of positive potential which are used to gate oscillator 25 off for blanking purposes. The gated output of oscillator 25 in turn is shown by the waveform of FIG. 2B to be a high frequency carrier wave present during the absence of the blanking pulses of FIG. 2A.

The video contrast information fed to video preamplifier 13 is shown in FIG. 2C to be a series of pulses. The intensifier control fed to video preamplifier and intensity mixer 13 over lead 14 is illustrated in FIG. 2D to be a steady D.-C. level. The output of video preamplifier 13 is illustrated in FIG. 2E to be the pulses of FIG. 2C superimposed on the D.-C. level of FIG. 2D. The output of IAGC amplifier 22 is also similar to FIG. 2E.

FIG. 2F illustrates the waveform present in the output of modulator 21 and coupling transformer 28. During time of the blanking period shown in FIG. 2A, the output of modulator 21 can be seen to equal zero. After termination of the blanking pulse, the output of modulator 21 consists of the carrier wave of 2B at a level determined by the intensifier signal or the constant level shown in FIGS. 2D and 2E. Upon occurrence of a video pulse as shown in FIG. 2C or as shown superimposed on the intensifier signal in FIG. 2E, the amplitude of the carrier output of modulator 21 is increased to the video amplitude, the carrier being thus amplitude modulated. Any video pulse such as the first pulse shown in FIG. 2C which occurs during the blanking period is not passed through the modulator 21.

FIG. 2G illustrates the output of the detector 27 which can be seen to be the video envelopes superimposed on a pedestal provided by the intensifier level and formed by the leading and trailing edges of the blanking pulses of FIG. 2A. The signal of FIG. 2G is then applied to the grid 11 of FIG. 1 in order to supply video contrast, intensifier and blanking information to the single electrode 11.

Figure 3:
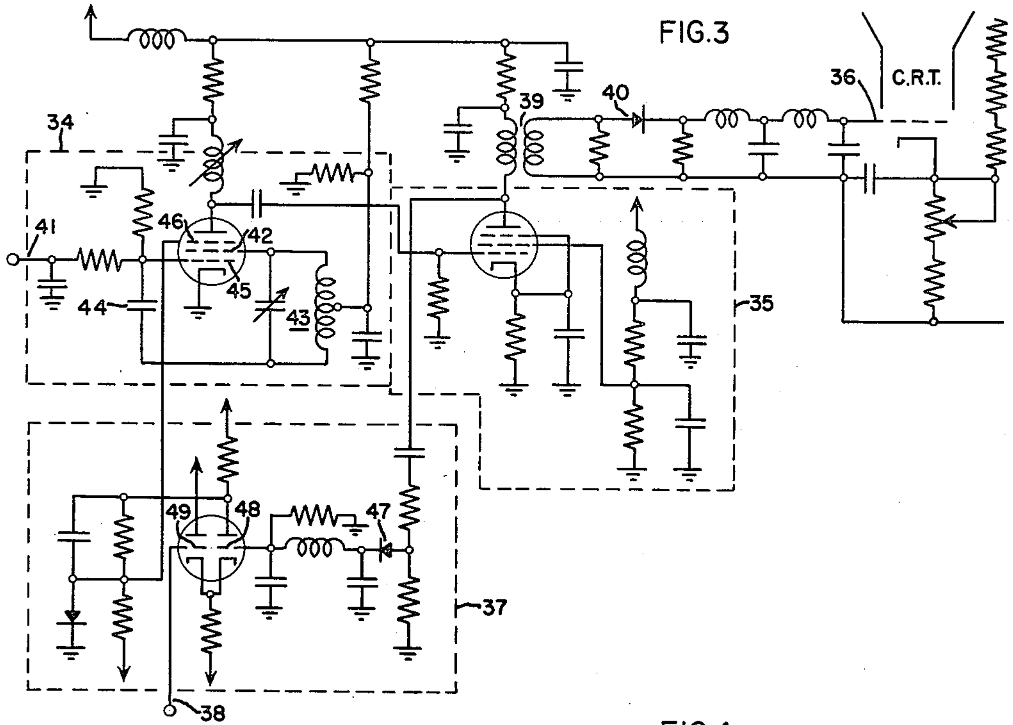
FIG 3 illustrates a schematic diagram showing one method of implementing the block diagram of FIG 1.

Referring now to the circuit of FIG. 3 there is illustrated one method of implementing circuitry similar to that shown in FIG. 1. The dashed line 34 encloses a combined oscillator and modulator circuit employing a Hartley oscillator electron coupled to the modulator portion of the tube. A power amplifier 35 is shown, whose function is to raise the level of the output of the oscillator-modulator 34 to a sufficient level to provide a cathode ray tube with the required power. An IAGC amplifier 37 is shown connected to the output of the power amplifier 35 and to the mixed video and intensity signal, as at lead 38, in order to provide degenerative feedback to the modulator portion of oscillator-modulator 34 and to insert the video and intensity signals into the modulator through the IAGC amplifier 37. The output of amplifier 35 is then coupled through a coupling transformer 39 and a detector, here shown as a diode 40, to the grid electrode 36 of a cathode ray oscilloscope.

The operation of the circuit of FIG. 3 is as follows. Gating information is provided over lead 41 to the oscillator portion of combined oscillator and modulator 34. The oscillator portion of circuit 34 includes screen electrode 42, L-C coupling networks 43, and coupling capacitor 44 connected back to control grid 45. Modulation is achieved by means of a second control grid 46 which is connected to the output of IAGC amplifier 37, and superimposes the video and intensity signals as a modulation on the carrier provided by the oscillator portion of the circuit 34. The IAGC amplifier 37 provides sufficient degeneration to produce a linear output over the range of operation. This is done by taking the output of power amplifier 35, detecting it by a diode detector 47, feeding the detected signal to grid 48 and amplifying the difference signal between the signal appearing on grid 48 and the video plus intensity signal appearing on grid 49, which difference signal is then fed to grid 46 for modulation of the carrier. The specific circuits employed in oscillator-modulator 34, power amplifier 35 and IAGC amplifier 37 are well known to those skilled in the art.

Figure 4:
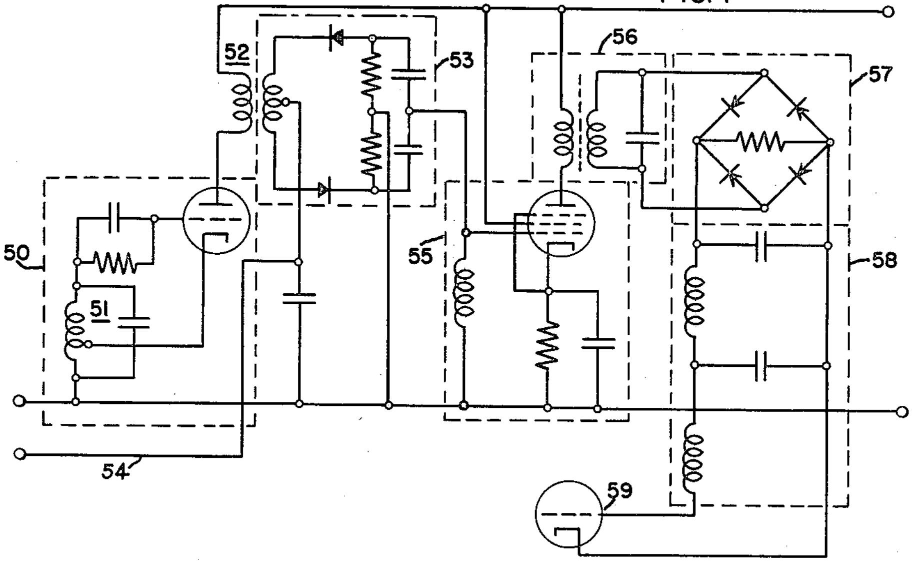
FIG. 4 illustrates a second schematic diagram for implementing the circuit of FIG 1.

The circuit of FIG. 4 illustrates a method of providing a carrier and modulating the carrier with video contrast information, amplifying the output of the modulator and coupling the amplified output to a cathode ray tube gun by means of a coupling transformer and detector. A Hartley oscillator 50 is used to provide a carrier frequency which may be gated by addition of a damping tube across the oscillator tank circuit 51 to provide for blanking. The carrier is then coupled by means of a coupling transformer 52 to a balanced modulator 53. The balanced modulator is provided with video contrast information over lead 54 to modulate the carrier output from oscillator 50. The output of balanced modulator 53 is amplified by means of power amplifier 55. The amplified modulated signal is then coupled by means of a coupling transformer 56 and an envelope detector 57 and filter network 58 to the grid 59 of a cathode ray tube oscilloscope. The operation of oscillator 50, balanced modulator 53, power amplifier 55, detector 57 and filter 58 is well known to those skilled in the art.

While particular embodiments of the invention have been illustrated, it will be understood, of course, that many modifications may be made, and it is therefore contemplated to cover by the appended claims any such modifications which fall within the true spirit and scope of the invention.

What I claim and desire to secure by Letters Patent of the United States is:

1. A cathode ray tube blanking, video and intensifier coupling circuit arranged to couple signals from blanking circuits and a video preamplifier intensity mixer to an electrode of an electrostatic cathode ray tube gun comprising oscillator means, means for coupling said blanking circuit signals to said oscillator means for gating said oscillator means on and off for blanking purposes, modulator means employing degenerative feedback for obtaining a modulation of the output of said oscillator means proportional to the video and intensity level, means for coupling said oscillator means and said video preamplifier intensity mixer to said modulator means, a cathode ray tube having a first and a second electrode, said first and second electrode being maintained at a high direct potential in reference to the direct potential level of the output of said video preamplifier, a coupling transformer having a primary winding and a secondary winding insulated from one another for high direct voltages, means connecting said primary winding to the output of said modulator means, a detector circuit, means for connecting said secondary winding serially with said detector circuit between said first and said second electrode, and means for connecting an auxiliary intensity control to said second electrode to allow adjustment for wide variation in cathode ray tube cutoff characteristics.

2. A cathode ray tube blanking, video and intensifier coupling circuit arranged to couple signals from blanking circuits and video information circuits to an electrode of a cathode ray tube gun comprising, high frequency oscillator means, means for coupling said blanking circuit signals to said oscillator means for gating said oscillator means on and off for blanking purposes, a direct current coupled video preamplifier adapted for connection to a source of signals to control intensity level and a source of video gain signals to control contrast, instantaneous automatic gain control means, means connecting the output of said video preamplifier to said instantaneous automatic gain control means, modulator means for obtaining a modulation of the output of said oscillator means proportional to the video and intensity level, means for coupling output signals from said instantaneous automatic gain control means and said oscillator means to said modulator means, a degenerative feedback connection from said modulator means to the input of said instantaneous automatic gain control means, a cathode ray tube having a first and a second electrode, said first and second electrode being maintained at a high direct potential in reference to the direct potential level of the output of said video preamplifier, a coupling transformer having a primary winding and a secondary winding insulated from one another for high direct voltages, means connecting said primary winding to the output of said modulator means, a detector circuit, means for connecting said secondary winding serially with said detector circuit between said first and said second electrode.

References Cited in the file of this patent

UNITED STATES PATENTS

| | | |
|---|---|---|
| 2,346,020 | Gillespie | Apr. 4, 1944 |
| 2,379,897 | Floyd | July 10, 1945 |
| 2,832,819 | Seely et al. | Apr. 29, 1958 |